US 6,583,860 B2

(12) United States Patent
Haga

(10) Patent No.: US 6,583,860 B2
(45) Date of Patent: Jun. 24, 2003

(54) RANGE FINDER

(75) Inventor: Shunichi Haga, Kodaira (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/043,302

(22) Filed: Jan. 14, 2002

(65) Prior Publication Data

US 2002/0093639 A1 Jul. 18, 2002

(30) Foreign Application Priority Data

Jan. 16, 2001 (JP) ........................................ 2001-007841

(51) Int. Cl.$^7$ ............................ G01C 3/00; G01C 3/22; G01C 3/08; G01C 3/26; G01C 5/00; G01C 5/02; F41G 1/38; F41G 1/42
(52) U.S. Cl. ..................... 356/3.01; 356/3.13; 356/21; 33/298
(58) Field of Search ........................... 356/139.05, 11, 356/15, 21, 3.13, 3.01, 4.01, 5.01; 33/297, 298, 285, 281, 284

(56) References Cited

U.S. PATENT DOCUMENTS

| 4,263,719 A | * | 4/1981 | Murdoch ...................... 33/297 |
| 4,617,741 A | * | 10/1986 | Bordeaux et al. .............. 33/228 |
| 5,280,332 A | * | 1/1994 | Tocher et al. ............... 356/3.15 |
| 6,466,306 B1 | * | 10/2002 | Davis ......................... 356/4.03 |

FOREIGN PATENT DOCUMENTS

JP  11-6710  1/1999

* cited by examiner

Primary Examiner—Thomas H. Tarcza
Assistant Examiner—Brian K Andrea
(74) Attorney, Agent, or Firm—Morgan, Lewis & Bockius LLP

(57) ABSTRACT

A range finder includes a light source for emitting a light beam to an object to be measured, a detector for detecting a reflected light from the object, a measuring part for calculating the distance to the object on the basis of the reflected light detected by the detector, a display capable of displaying two objects to be measured as well as the distance to the object measured by the measuring part, a finder for observing the two objects shown on the display, at least one index set on the display for indicating the positions regarding the two objects shown on the display, a field angle setting portion, equipped with a moving part for moving the index to the position of the object, for setting a field angle between the two objects on the basis of the positions indicated by the index, and a calculating part for calculating the separation between the two objects on the basis of the distance to the object measured by the measuring part and the field angle set by the field angle setting portion. The two objects can be observed through the finder, and the separation between the two objects can be calculated on the basis of the field angle relative to the two objects set by the field angle setting portion and the distance to the object calculated by the measuring part.

8 Claims, 14 Drawing Sheets

RANGE FINDER

INCORPORATION BY REFERENCE

The disclosure of the following priority application is herein incorporated by reference: Japanese Patent Application No. 2001-007841 filed Jan. 16, 2001.

BACKGROUND OF THE INVENTION

1. Field of the Invention

The present invention relates to a range finder using beam light such as a laser and, in particular, relates to a range finder capable of measuring a separation between two target objects.

2. Description of Related Art

The current range finder is composed of a light emitting device for emitting a laser beam such as a laser diode, an objective lens for irradiating an object to be measured with the light emitted from the light emitting device, a detector for detecting the light reflected from the object to be measured via a receiving lens, and a measuring part for measuring the distance to the object on the basis of the reflected light detected by the detector.

The range finder irradiates the object to be measured by the laser beam, detects the reflected light from the object to be measured, and measures the distance to the object by measuring the time interval between the emission of the laser beam and the detection of the reflected light.

However, the range finder has not been able to measure the separation between two targets, nor the height of a target.

SUMMARY OF THE INVENTION

The present invention is made in view of the aforementioned problem and has an object to provide a range finder including a light source for emitting a light beam to an object to be measured, a detector for detecting a reflected light from the object, a measuring part for calculating the distance to the object on the basis of the reflected light detected by the detector, a display capable of displaying two objects to be measured as well as the distance to the object measured by the measuring part, a finder for observing the two objects shown on the display, at least one index set on the display for indicating the positions regarding the two objects shown on the display, a field angle setting portion, equipped with a moving part for moving the index to the position of the object, for setting a field angle between the two objects on the basis of the positions indicated by the index, and a calculating part for calculating the separation between the two objects on the basis of the distance to the object measured by the measuring part and the field angle set by the field angle setting portion.

The two objects can be observed through the finder, and the separation between the two objects can be calculated on the basis of the field angle relative to the two objects set by the field angle setting portion and the distance to the object calculated by the measuring part.

In one preferred embodiment of the present invention, the number of the index is two, and the separation between the two indexes can be variable in accordance with the separation between the two objects.

In one preferred embodiment of the present invention, the moving part in the field angle setting portion is a rotating ring set on the finder.

In one preferred embodiment of the present invention, the field angle setting portion includes a potentiometer for detecting a rotating angle of the rotating ring, and an angle calculating circuit for calculating the field angle on the basis of the detected result of the potentiometer.

In one preferred embodiment of the present invention, the index indicates the position of the object by a contrast between a clear part and a dark part.

In one preferred embodiment of the present invention, the range finder further includes a memory for storing the separation between the two objects calculated by the calculating part.

In one preferred embodiment of the present invention, the display shows the separation between the two objects in an area other than the area where the distance to the object is shown.

According to another aspect of the present invention, a range finder including a light source for emitting a light beam to an object to be measured, a detector for detecting a reflected light from the object, a measuring part for calculating the distance to the object on the basis of the reflected light detected by the detector, a display capable of displaying two objects to be measured as well as the distance to the object measured by the measuring part, a finder for observing the two objects shown on the display, at least one index set on the display for indicating the positions regarding the two objects shown on the display, a field angle setting portion, equipped with a moving part for moving the index to the position of the object, for setting a field angle between the two objects on the basis of the positions indicated by the index, a calculating part for calculating the separation between the two objects on the basis of the distance to the object measured by the measuring part and the field angle set by the field angle setting portion, a power-measurement switch for inputting power supply and for carrying out measurement, and a mode switch for changing mode to the separation measuring mode.

DESCRIPTION OF THE PREFERRED EMBODIMENT

Embodiment according to the present invention will be explained below with reference to accompanying drawings.

Figure 1:
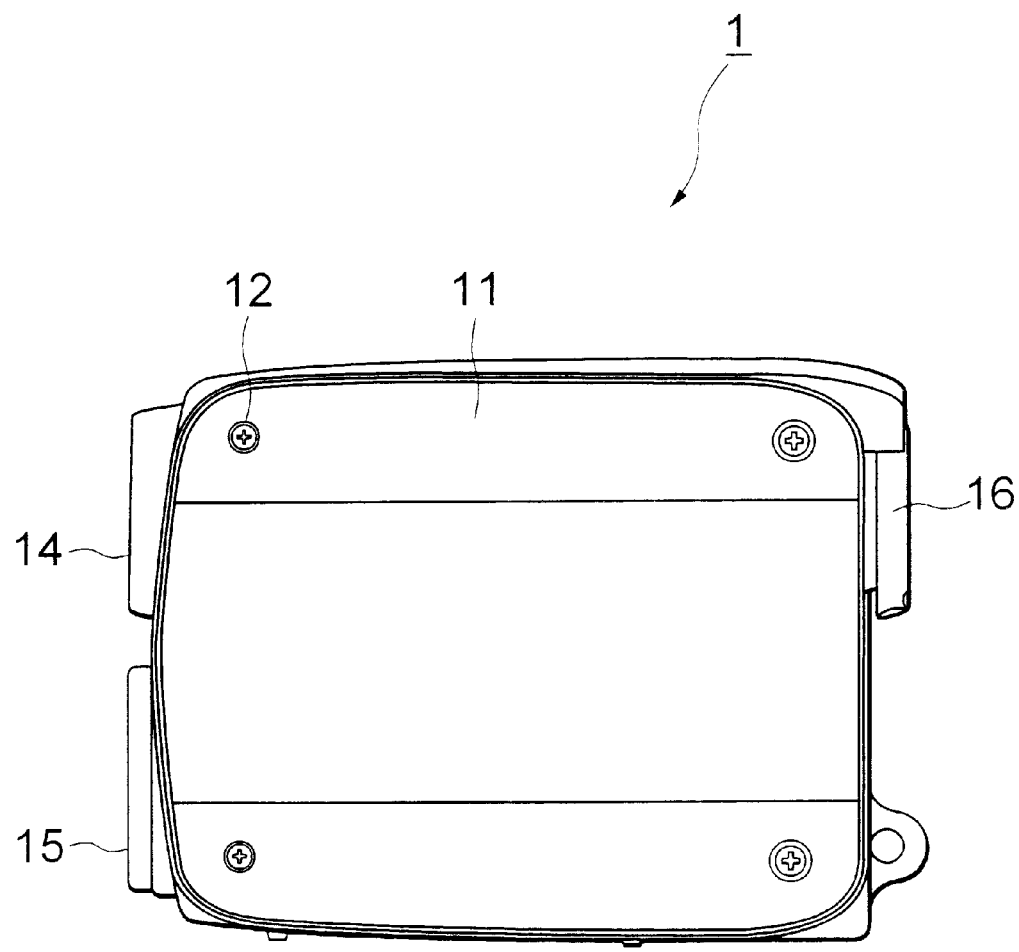
FIG. 1 is a drawing showing a front elevation view of a range finder according to an embodiment of the present invention.
Figure 2:
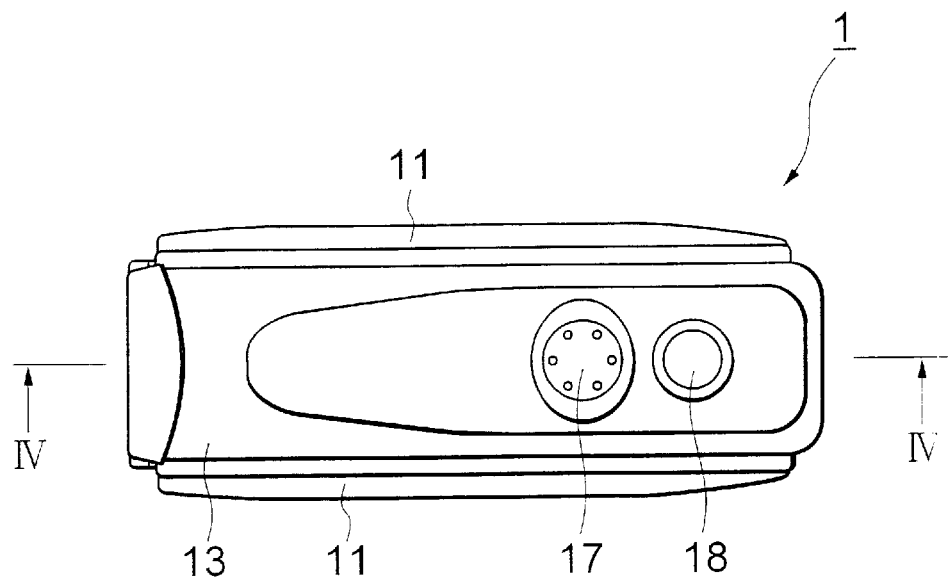
FIG. 2 is a drawing showing a top plan view of the range finder according to the embodiment of the present invention.
Figure 3:
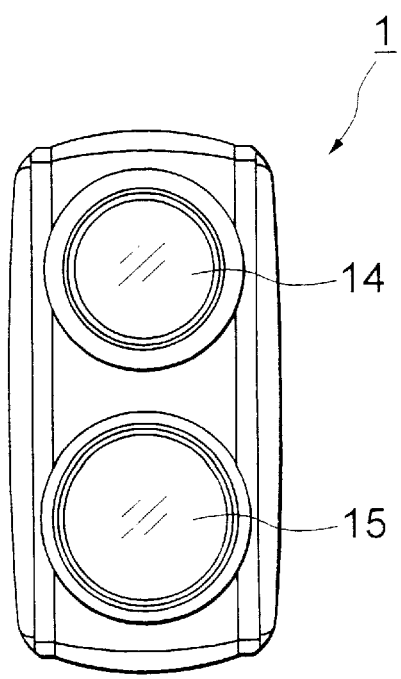
FIG. 3 is a drawing showing a side elevation view of the range finder according to the embodiment of the present invention.

FIGS. 1, 2, and 3 are drawings showing a front elevation view, a top plan view, and a side elevation view, respectively, of a range finder according to an embodiment of the present invention.

Side boards 11 are fixed to a body 13 by screws 12 in the front and rear sides of the range finder 1.

An objective lens 14 and a receiving lens 15 are set in one side of the range finder 1. A rubber eyecup 16 is attached on an eyepiece set in the other side of the range finder 1.

A power-measurement switch 17 and a mode switch 18 are set in the upper surface of the range finder 1.

Figure 4:
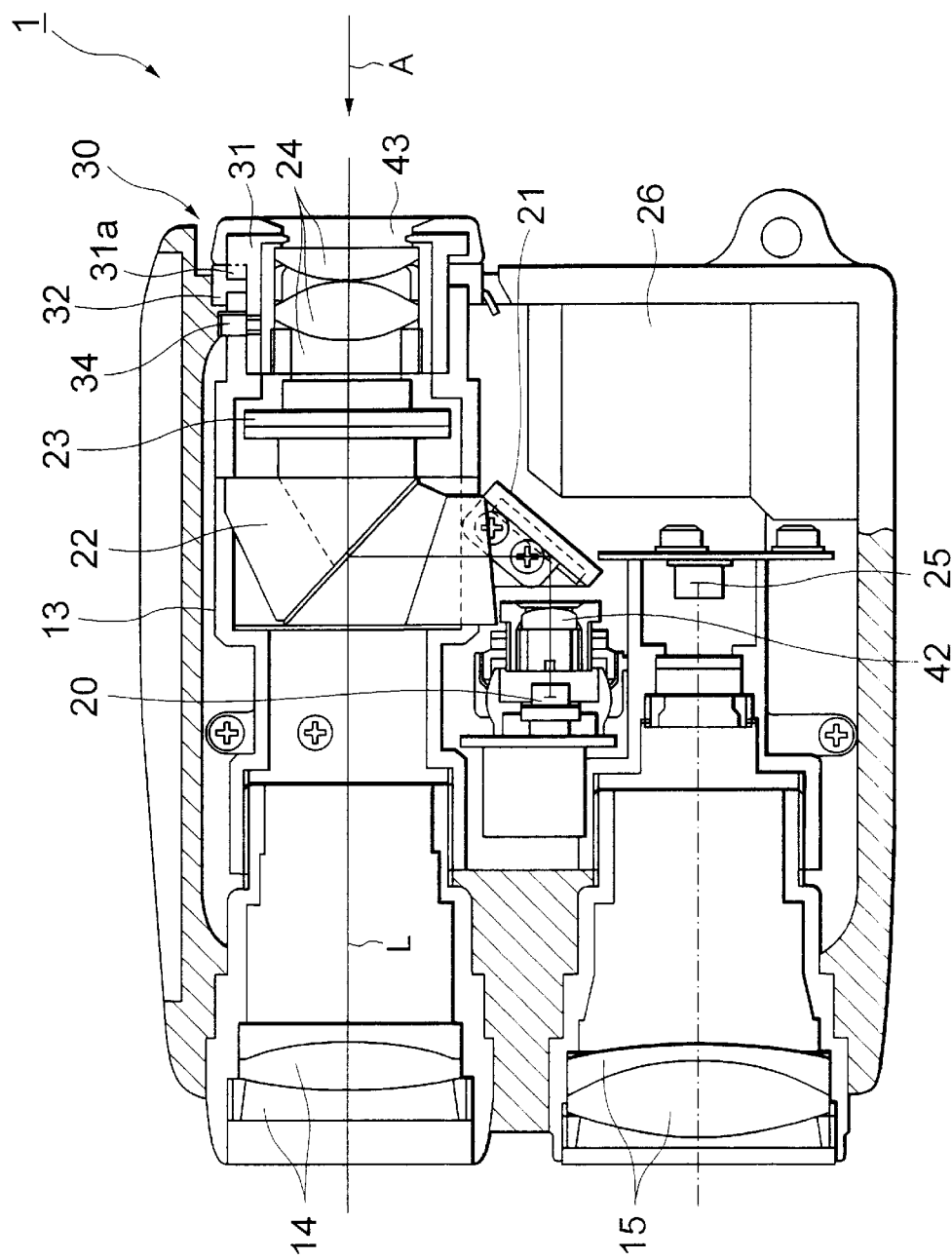
FIG. 4 is a drawing showing a sectional view of FIG. 2 sectioned along the line IV—IV.
Figure 5:
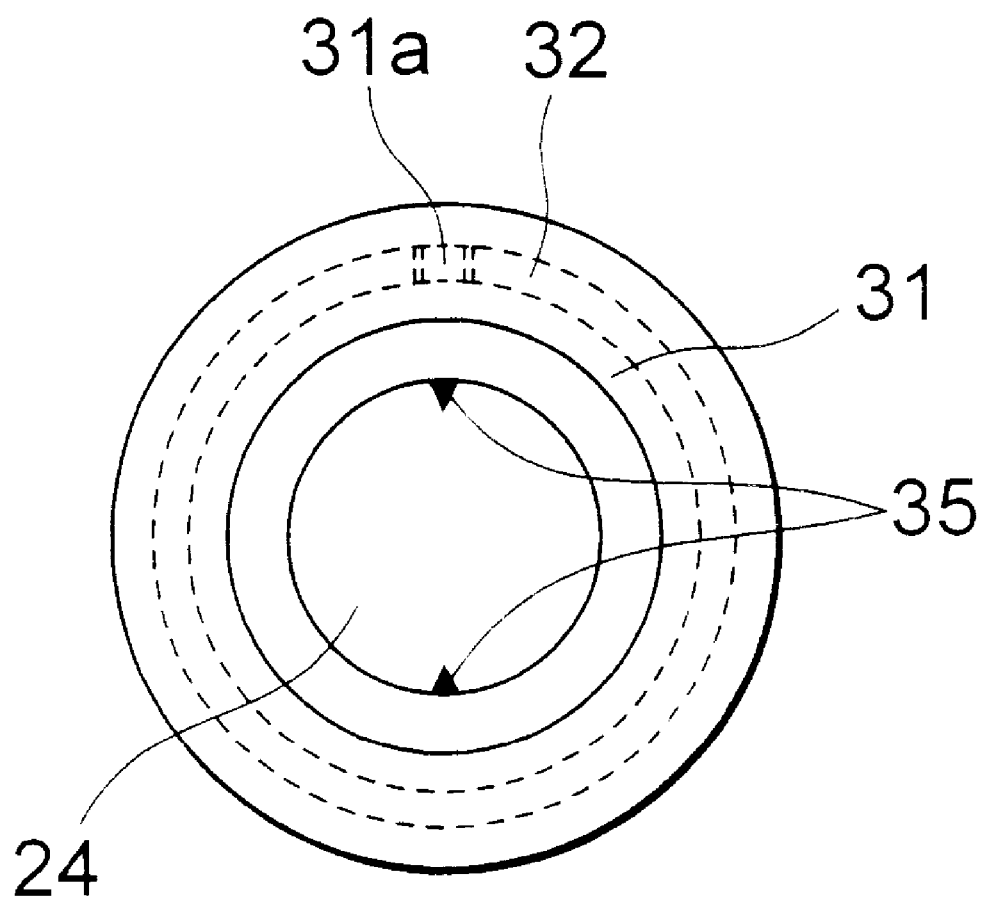
FIG. 5 is a drawing showing a view of a field angle setting portion along the arrow A shown in FIG. 4.

FIG. 4 is a drawing showing a sectional view of FIG. 2 sectioned along the line IV—IV. FIG. 5 is a drawing showing a view of a field angle setting portion along the arrow A shown in FIG. 4.

The range finder 1 is equipped with a laser emitting part (light source) 20, a deflecting mirror 21, a prism 22, an objective lens 14, an LCD display (display part) 23, an eyepiece 24, a receiving lens 15, a detector (detecting part) 25, and a power supply 26.

A laser diode, for example, may be used as the laser emitting part 20.

The deflecting mirror 21 leads to a target (object to be measured) 5 the light emitted from the laser emitting part 20 converged by a condenser lens 42 via the objective lens 14.

The LCD display 23 is set on an optical axis L connecting the objective lens 14 and the eyepiece 24. A reticle 23A (shown in FIG. 9) and the like displayed on the LCD display 23 are enlarged by the eyepiece 24.

The positions of the targets 5A and 5B are indicated by a pair of indexes 35, 35 each having a triangular shape, as described later.

A field angle setting portion (field angle setting means) 30 is set on the eyepiece 24.

The field angle setting portion 30 is composed of a rotating ring 31 for moving the indexes, a potentiometer 32 for detecting a rotation angle of the rotating ring 31, and an angle calculating part (angle calculating circuit) 33 explained below (see FIG. 6).

The rotating ring 31 is held rotatably about an outer periphery of a lens barrel of an eyepiece lens 24. The rotating ring 31 is formed with a groove in the peripheral direction thereon over 90° or preferably over 180°, with which groove a guide pin 34 planted inwardly on an inner periphery of the body 13 is engaged to hold the rotation ring 31 and guide rotational movement of the rotation ring 31 about the eyepiece 24. A pair of indexes 35, 35 having a triangular shape are formed vertically on the rotating ring 31 (see FIG. 5). These indexes 35, 35 indicate the respective targets 5A and 5B, in a manner described later.

The body 13 is fixedly provided with a potentiometer 32 adjacent to the rotating ring 31. A projection portion 31a of the rotating ring 31 is engaged with a rotary portion of the potentiometer 32 which detects the displacement of the rotation ring 31 (the amount of rotational movement) thereof. More in detail, the potentiometer 32 is so constructed that electric resistance is variable depending on the rotation angle of the rotary portion of the potentiometer 32.

A photodiode, for example, may be used for the detector 25. The detected current of the detector 25 is output to a calculation-control circuit 40 (shown in FIG. 6).

Figure 6:
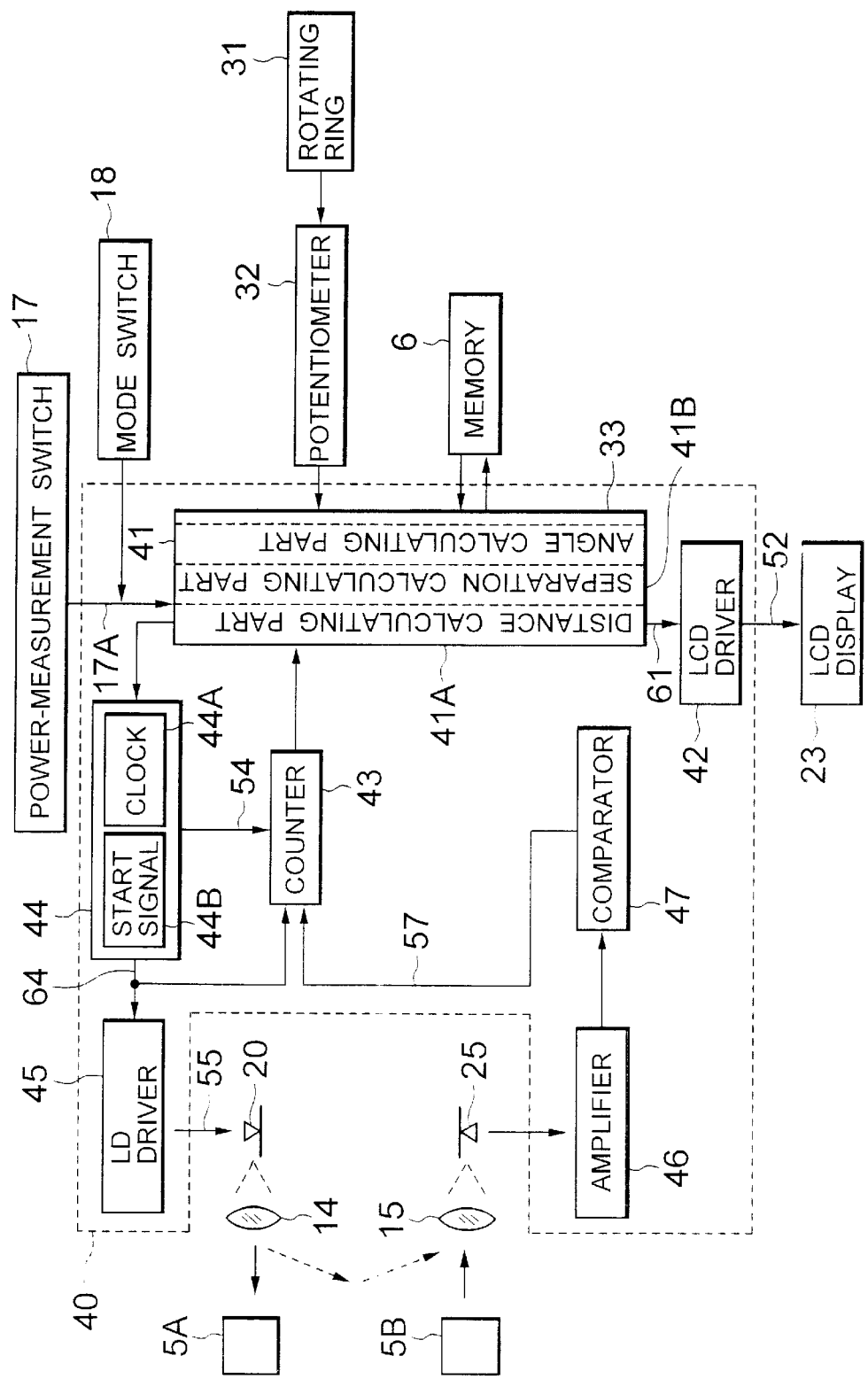
FIG. 6 is a block diagram explaining a calculation-control circuit.

FIG. 6 is a block diagram explaining the calculation-control circuit 40.

The calculation-control circuit 40 is equipped with a CPU 41, an LCD driver 42, a counter 43, a timing controller 44, an LD driver 45, an amplifying circuit 46, and a comparator 47.

The timing controller 44 has a clock generating circuit 44A and a starting signal circuit 44B.

The clock generating circuit 44A generates a clock signal 54 as a reference clock signal by dividing a master clock with, for example, a flip-flop circuit. Here, the master clock is generated by a crystal resonator or a ceramic resonator. The clock signal 54 is output to the counter 43 when a trigger signal 51 is input.

The starting signal circuit 44B outputs a starting signal 64 synchronized with the input of the clock signal 54.

The LD driver 45 generates an emitting signal 55 when the starting signal 64 is input.

The LD driver 45 is equipped with an n-p-n transistor and an emitter resistance, and has a construction that the laser emitting part 20 is energized to emit light by a constant time with constant-current on the basis of the starting signal 64.

The amplifying circuit 46 transforms the detected current of the detector 25 into a voltage signal in accordance with the light power, and amplifies it.

The comparator 47 compares the output of the amplifying circuit 46 with a reference voltage as a threshold value and outputs, for example, a high level stop signal 57 when the output of the amplifying circuit 46 exceeds the threshold.

The counter 43 starts counting when the a starting signal 64 is input thereto, finishes counting when the stop signal 57 is input, and outputs the counted value to the CPU 41.

The CPU 41 is equipped with a distance calculating part (measuring means) 41A, a separation calculating part (calculating means) 41B, and an angle calculating part 33.

The distance calculating part 41A calculates the distance D to the targets 5A and 5B on the basis of the light velocity and the time spent for the round trip to the target 5 obtained from the reference clock frequency and the counted value.

Figure 10:
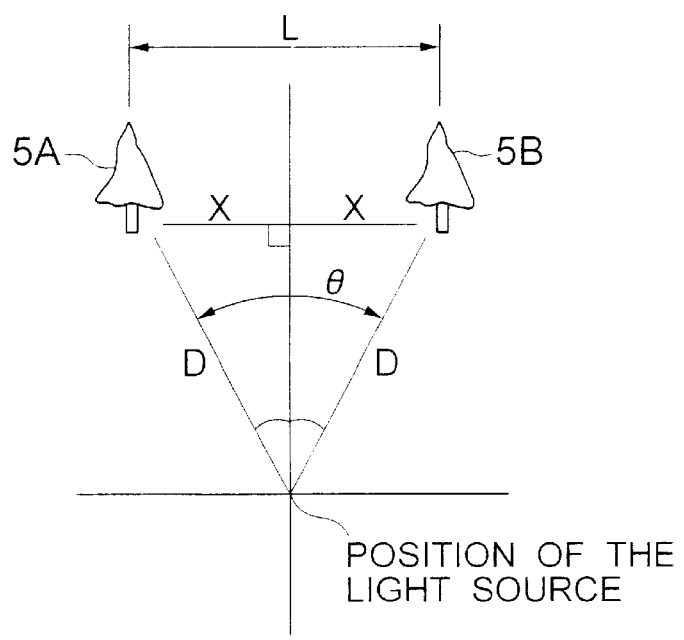
FIG. 10 is a drawing explaining the method for measuring the separation between two targets.

The angle calculating part 33 derives the field angle θ from the detected value of the potentiometer 32 with reference to a memory 6 (see FIG. 10).

The separation calculating part 41B calculates the separation L between the two targets 5A and 5B, or the height H of the target, and outputs a display signal 61.

The CPU 41 outputs the trigger signal 51 to the timing controller 44 in response to inputting a measurement start signal 17A by pushing the power-measurement switch 17.

By the way, when the power-measurement switch 17 has not been operated for more than a predetermined time (for example, eight seconds), the CPU 41 shuts off the power supply to the LCD display 23 and the like, so that the power supply is shut off automatically.

In response to pushing the mode switch 18, the CPU 41 changes the modes, in order, which include display mode of the unit of measuring distance such as meter (m) and yard (YD), the separation-measuring mode, separation-distance measuring, height measuring mode and the like.

The above-mentioned method may be replaced by a method which changes automatically the modes by pushing the power-measurement switch 17 for several seconds.

In response to inputting the display signal 61, the LCD driver 42 outputs a light-up signal 52, and turns on the LCD display 23.

By the way, an EEPROM is used for the memory 6.

Figure 7:
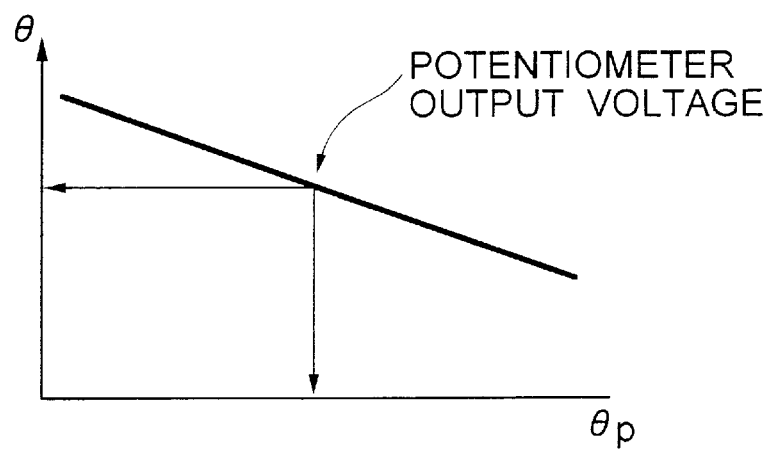
FIG. 7 is a graph showing the relation between the rotation angle $\theta_P$ of a potentiometer and the field angle $\theta$.

FIG. 7 is a graph showing the relation between the rotation angle $\theta_P$ of the potentiometer 32 and the field angle θ.

A default value of the field angle θ relative to the rotation angle $\theta_P$ of the potentiometer 32 is stored in the memory 6 shown in the table in FIG. 7. Accordingly, when the rotation angle $\theta_P$ is set, the field angle θ is determined.

Then, the method for measuring a distance D to a target 5 by using the range finder 1 is explained.

Figure 8:
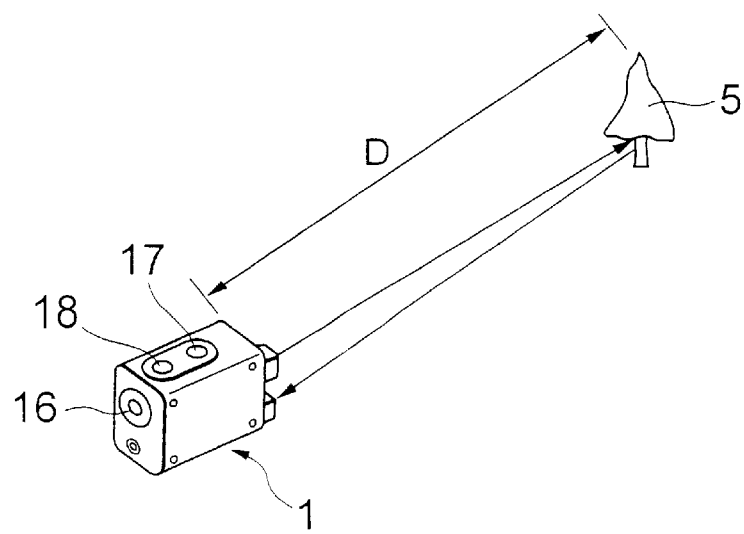
FIG. 8 is a drawing explaining the relation between a range finder and a target.
Figure 9:
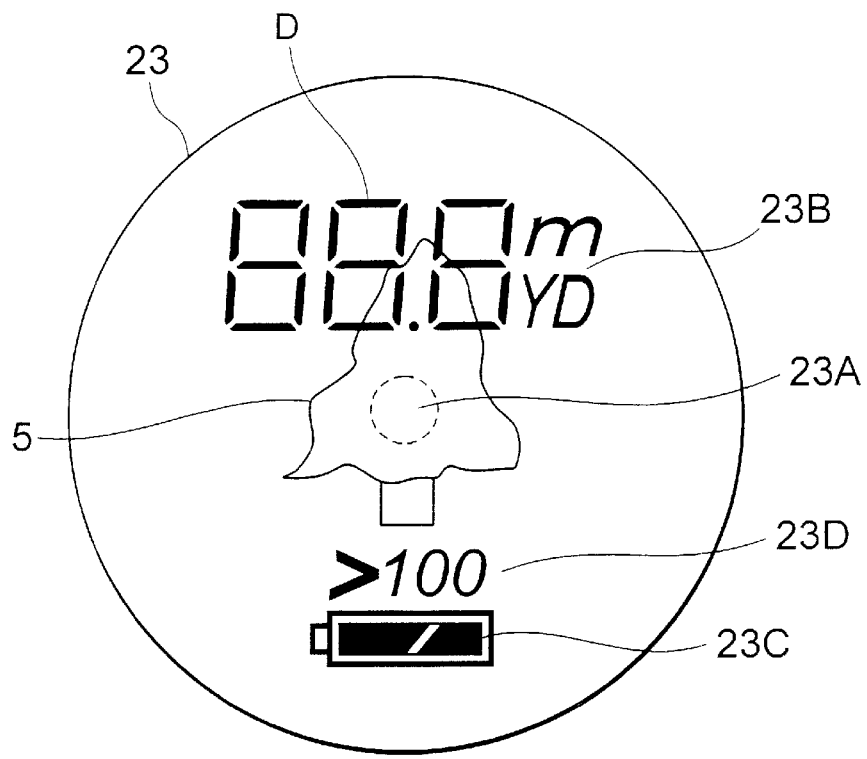
FIG. 9 is a drawing showing an expanded view of an LCD display in the state according to FIG. 8.

FIG. 8 is a drawing explaining the relation between the range finder and the target. FIG. 9 is a drawing showing an expanded view of an LCD display in the state according to FIG. 8.

In FIG. 8, the distance to the tree (target 5) is assumed to be D.

First, the power-measurement switch 17 is pushed for displaying a reticle 23A, a distance unit 23B, a display for remaining amount of battery 23C, a mode 23D, and the like in the LCD display 23. These displays are seen through the eyepiece 24 superimposed on the image of the target 5 (see FIG. 9).

Then, the reticle 23A is adjusted to the target 5, and the laser beam is emitted toward the target 5 by pushing the power-measurement switch 17 again.

With detecting the reflection light from the target 5 by the detector 25, the distance D to the target 5 is calculated by the distance calculating part 41A, and is displayed on the LCD display 23.

Then, the method for measuring the separation between two targets 5A and 5B located almost same distance will be explained with reference to FIGS. 10 and 11.

Figure 11:
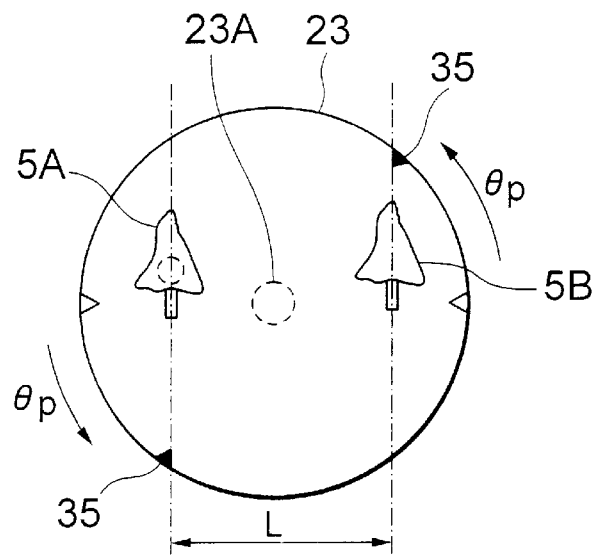
FIG. 11 is a drawing explaining the method for measuring the separation between two targets.
Figure 12:
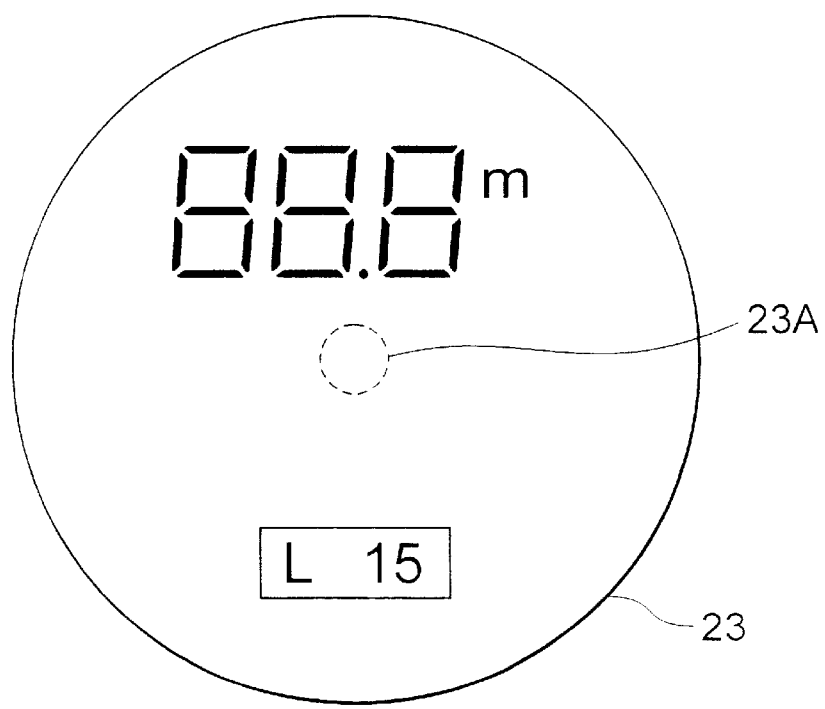
FIG. 12 is a drawing showing an expanded view of an example of the LCD display.
Figure 13:
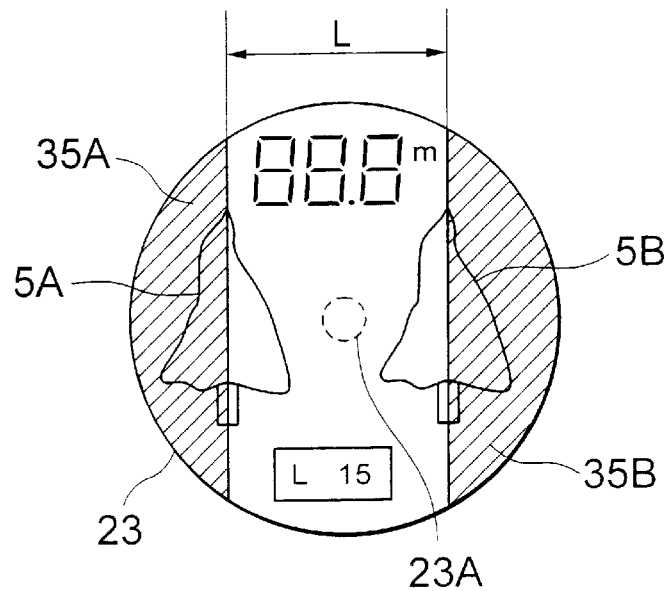
FIG. 13 is a drawing showing an expanded view of another example of the LCD display.

FIGS. 10 and 11 are drawings explaining the method for measuring the separation between two targets. FIG. 12 is a drawing showing an expanded view of an example of the LCD display. FIG. 13 is a drawing showing an expanded view of another example of the LCD display. FIGS. 10 through 13 show a case where both targets are almost at the same distance, so that the difference in the distance to each target need not be taken into consideration.

First, the mode is set to the separation-measuring mode by pushing the mode switch 18, and the reticle 23A is adjusted to the center between the targets 5A and 5B.

Then, by rotating the rotating ring 31, the indexes 35 are adjusted to the respective targets 5A and 5B in the following way:

As shown in FIG. 11, according to the present embodiment there are two indexes 35 which are symmetrical with respect to the center of the LCD display 23. Each index 35 can be revolved in a body about the center of the LCD display. At first, each index is set to the standard position. In this separation-measuring mode, the standard position is assumed to be the position where the indexes are located horizontally with each other (shown by outline targets in FIG. 11). On adjusting each index to the target, an observer revolves the rotating ring 31 until the vertical lines passing through the indexes (dashed lines in FIG. 11) intersect the targets, respectively.

At this moment, the rotation angle $\theta_P$ of the rotating ring 31 detected by the potentiometer 32 is output to the angle calculating part 33, and the field angle θ is determined with reference to the memory 6.

By the way, FIG. 13 shows a case where the positions of the indexes 35A and 35B are shown on the LCD display 23 in order to make adjustment easier than the case in FIG. 11. An observer can see the LCD display 23 by looking through the finder 43. Accordingly, both targets 5A and 5B are seen at a same time through the finder 43.

In FIG. 13, the indexes 35A and 35B are two regions (hatched areas) surrounded by an outer periphery of the LCD display 23 and two respective lines which extend vertically and are symmetric right and left about the rotation center of the rotating ring 31. A distance or separation L between the vertical lines of those hatched areas, changes in accordance with the rotation angle $\theta_P$ of the rotating ring 31. Those two hatched areas which indicate the indexes 35A and 35B, respectively, are made to have a good contrast with a central clear area therebetween.

The operator observes the LCD display 23 through the finder 43 and adjusts the vertical lines of the indexes 35A and 35B to align with the targets 5A and 5B, respectively.

Then, the reticle 23A is adjusted to one of the target 5A or 5B, and the laser beam is emitted toward the target by pushing the power-measurement switch 17 again.

With detecting the reflection light from the target 5A or 5B by the detector 25, the distance D (for example, 88.8 m) to the target is calculated by the distance calculating part 41A, and is displayed on the LCD display 23 (see FIG. 12).

The separation L (for example, L=15) between the two targets, 5A and 5B, is calculated by the separation calculating part 41B on the basis of the field angle θ and the distance D to the target, and is displayed on the LCD display 23 (see FIG. 12).

The separation L is derived from the following numerical expression (1);

$$L \approx 2X = 2D \sin(\theta/2) \tag{1}$$

Figure 14:
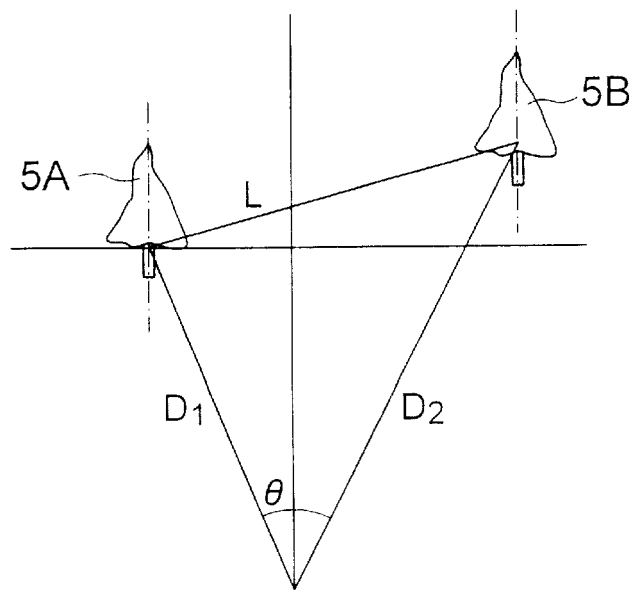
FIG. 14 is a drawing explaining the method for measuring the separation between two targets.
Figure 15:
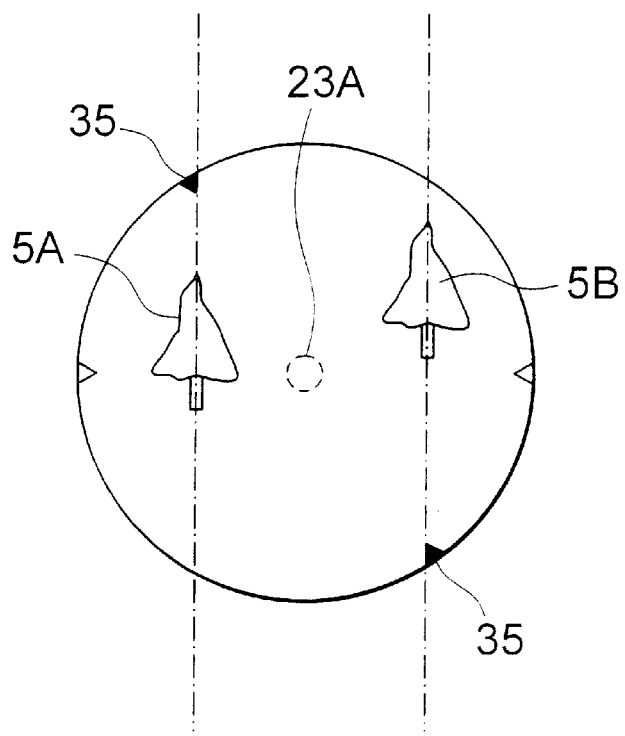
FIG. 15 is a drawing showing an expanded view of an example of the LCD display.

FIGS. 14 and 15 are the case where the difference in the distance to each target is taken into consideration.

FIG. 14 is a drawing explaining the method for measuring the separation between two targets. FIG. 15 is a drawing showing an expanded view of an example of the LCD display.

First, the mode is set to the separation-distance-measuring mode, and the reticle 23A is set to the center between the targets 5A and 5B.

Then, by rotating the rotating ring 31, the indexes 35 are adjusted to the respective targets 5A and 5B such that the vertical lines passing through the respective indexes 35 intersect the targets SA and 5B, respectively.

At this moment, the rotation angle $\theta_P$ of the rotating ring 31 detected by the potentiometer 32 is output to the angle calculating part 33, and the field angle θ is determined with reference to the memory 6.

Then, the reticle 23A is adjusted to one of the target, for example, 5A, and the laser beam is emitted toward the target 5A by pushing the power-measurement switch 17 again. With detecting the reflection light from the target 5A by the detector 25, the distance D1 to the target 5A is calculated by the distance calculating part 41A, is displayed on the LCD display 23, and is stored in the memory 6.

Then, the reticle 23A is adjusted to the other target 5B, and the laser beam is again emitted toward the target 5B. With detecting the reflection light from the target 5B by the detector 25, the distance D2 to the target 5B is calculated by the distance calculating part 41A, and is displayed on the LCD display 23.

The separation L between the two targets 5A and 5B, is calculated by the separation calculating part 41B on the basis of the field angle θ and the distances D1 and D2 to the two targets 5A and 5B, and is displayed on the LCD display 23.

The separation L is derived from following numerical expression (2);

$$L = (D1^2 + D2^2 - 2D1 \cdot D2 \cos \theta)^{1/2} \quad (2).$$

Then, the method for measuring the height H of a target will be explained with reference to FIGS. 16 through 19.

Figure 16:
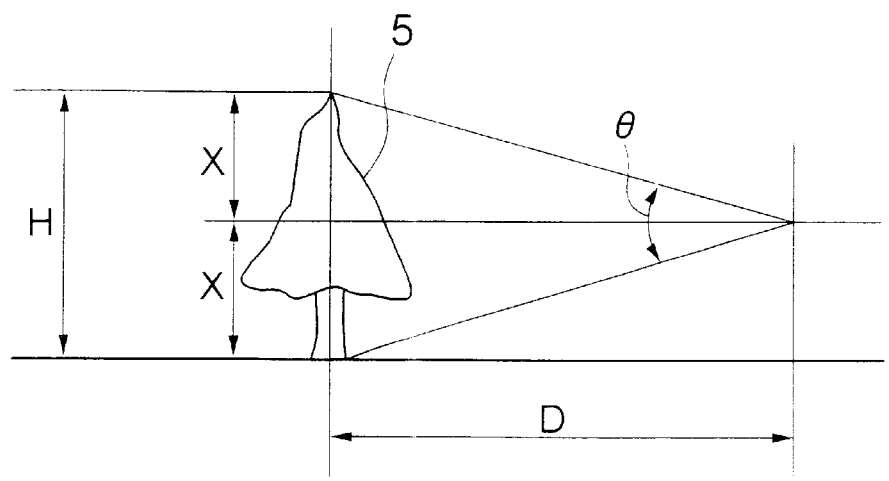
FIG. 16 is a drawing explaining the method for measuring the height of a target.
Figure 17:
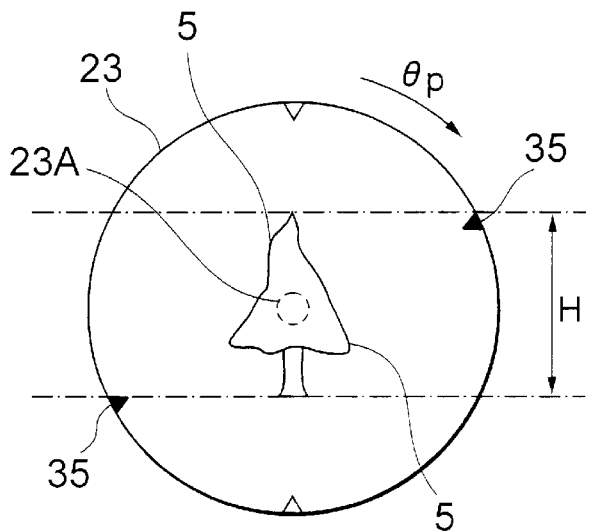
FIG. 17 is a drawing explaining the method for measuring the height of a target.
Figure 18:
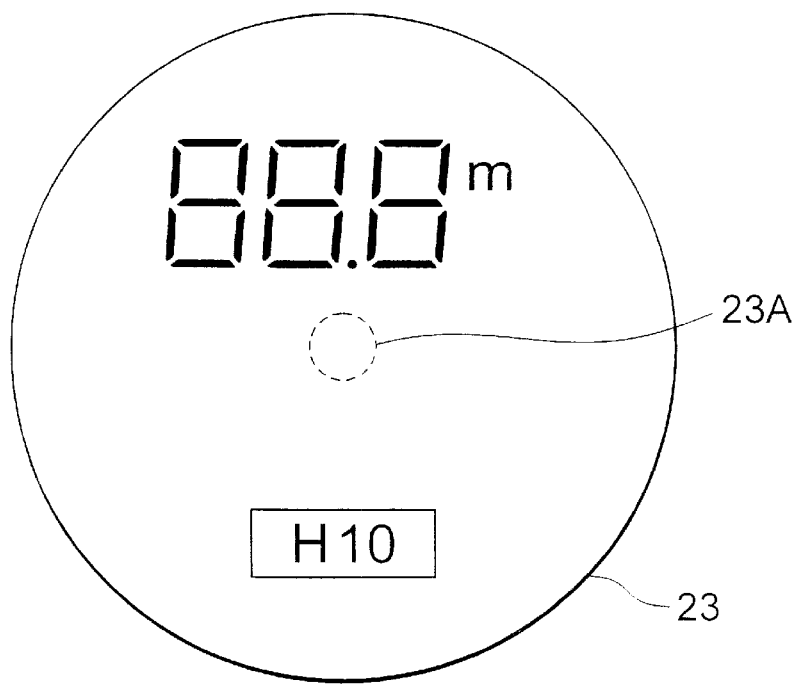
FIG. 18 is a drawing showing an expanded view of an example of the LCD display.
Figure 19:
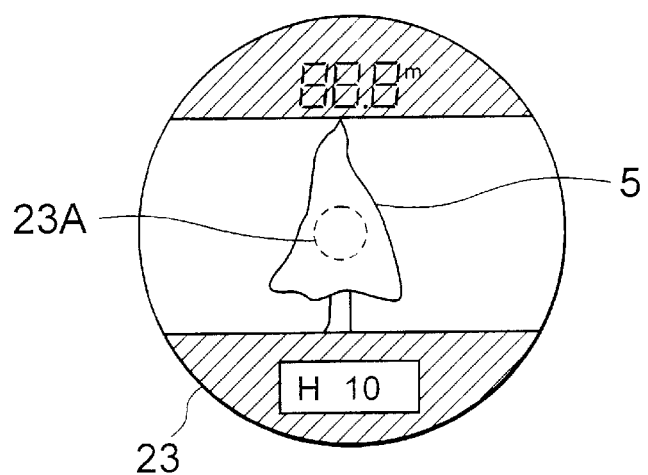
FIG. 19 is a drawing showing an expanded view of another example of the LCD display.

FIGS. 16 and 17 are drawings explaining the method for measuring the height of a target. FIG. 18 is a drawing showing an expanded view of an example of the LCD display. FIG. 19 is a drawing showing an expanded view of another example of the LCD display. The display showing the separation between the two objects, the height of the target, or the like can be shown in an area other than the area where the distance to the object is shown.

First, the mode is set to the height-measuring mode, and the reticle 23A is set to the center between the top and the bottom of the target 5.

In this height-measuring mode, the standard positions of two indexes 35 and 35 of the rotating ring 31 are assumed to be the positions where the two indexes are located on a vertical line, as shown by outline indexes in FIG. 17.

The rotating ring 31 is first set so that the indexes 35 and 35 are located in the standard positions.

Then, the rotating ring 31 is rotated by an angle $\theta_P$ that the two indexes 35 and 35 may be located on the two horizontal lines passing through the top and bottom of the target 5, respectively.

At this moment, the rotation angle $\theta_P$ of the rotating ring 31 which is detected by the potentiometer 32 is output to the angle calculating part 33, the field angle θ is determined with reference to the memory 6.

Then, the laser beam is emitted toward the target 5 by pushing the power-measurement switch 17. With detecting the reflection light from the target 5 by the detector 25, the distance D to the target 5 is calculated by the distance calculating part 41A, and is displayed on the LCD display 23.

The height H of the target 5 is calculated by the separation calculating part 41B on the basis of the field angle θ and the distances D, and is displayed on the LCD display 23 (see FIG. 18).

The height H is derived from following numerical expression (3);

$$H = 2X = 2D \tan(\theta/2) \quad (3).$$

According to the height-measuring mode, the separation between the targets 5A and 5B, and the height of the target 5 can be measured easily by simply rotating the rotating ring 31. Moreover, since the construction is simple, the range finder 1 can be made compact.

Figure 20:
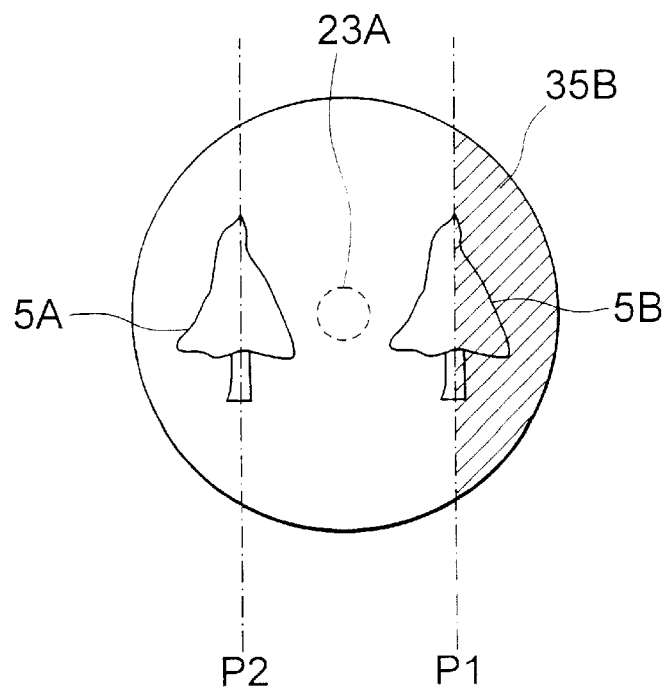
FIG. 20 is a drawing showing an expanded view of a modified example of the LCD display.

FIG. 20 is a drawing showing an expanded view of a modified example of the LCD display.

The display shown in FIG. 20 is obtained when the mode is changed to the separation-measuring mode by pushing the mode switch 18.

This modified example is characterized in the following way:

First, an index 35B is moved to the position P1 by rotating a rotating ring (not shown).

When the index 35B has been moved to the position P1, the power-measuring switch 17 is pushed for memorizing the position P1 on a memory.

Then, the index 35B is moved to the position P2. After the index 35B has been moved to the position P2, the power-measuring switch 17 is pushed for memorizing the position P2 on the memory.

By the way, for memorizing the position P1 or P2, the switch 17 is pushed, for example, for less than one second. For measuring the distance to the target 5A or 5B, the switch 17 is pushed, for example, for more than two seconds.

Therefore, the LCD display 23 of this example is different from that of the other examples described above.

The field angle is derived from the moving amount of the index 35B.

Figure 21:
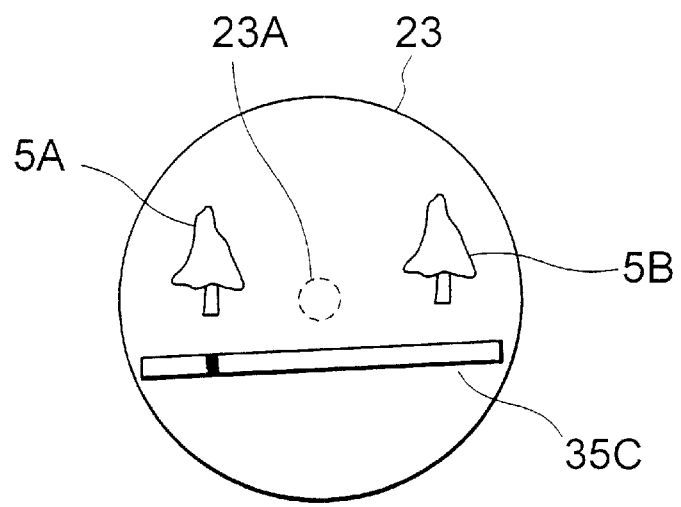
FIG. 21 is a drawing showing an expanded view of a modified example of the LCD display.

FIG. 21 is a drawing showing an expanded view of a modified example of the LCD display. A measuring bar 35C is shown in a display 23 as an index. The length of the measuring bar 35C is designed approximately same as the diameter of the display 23. The measuring bar 35C has a light point movable along the length. The light point is adjusted to each target. The movement of the light point is carried out by rotating a rotating ring 31 as described before. Then, the position of each target is detected by detecting the adjusted position of the light point. The method of detecting the target position by detecting the adjusted position of the light point is similar to the method for detecting the moving amount of the index, which is described above with reference to FIG. 20.

Figure 22:
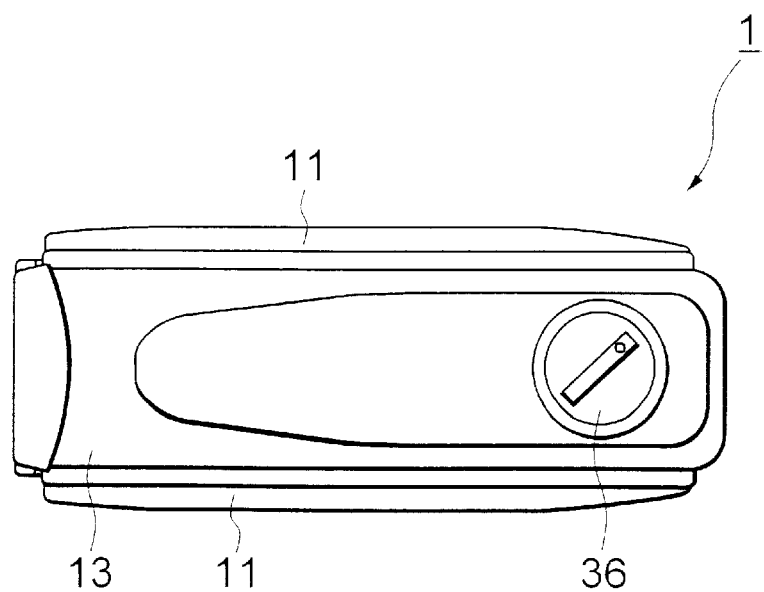
FIG. 22 is a drawing showing a bottom view of the range finder.

FIG. 22 is a bottom view of the range finder 1 in the present embodiment. A reference numeral 36 in FIG. 22 denotes a lid of a battery receiving chamber 26 in FIG. 4. The lid is circular as viewed from the above and is formed with a semi-circular groove 37 at the center of the lid so that a coin is partially fitted in the groove to enable the lid 36 rotate and screw into the body 13.

Figure 23A:
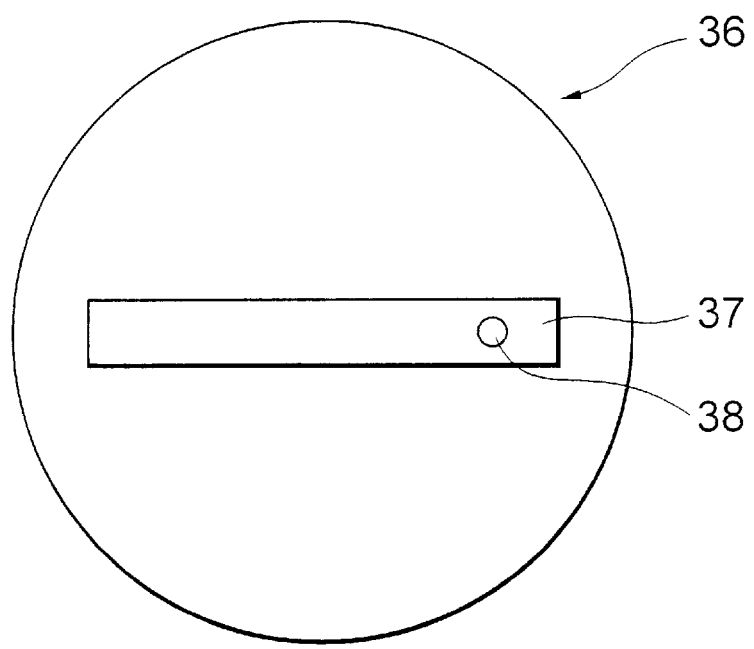
FIG. 23A is a drawing showing an expanded top plan view of a lid of a battery receiving portion in the range finder.
Figure 23B:
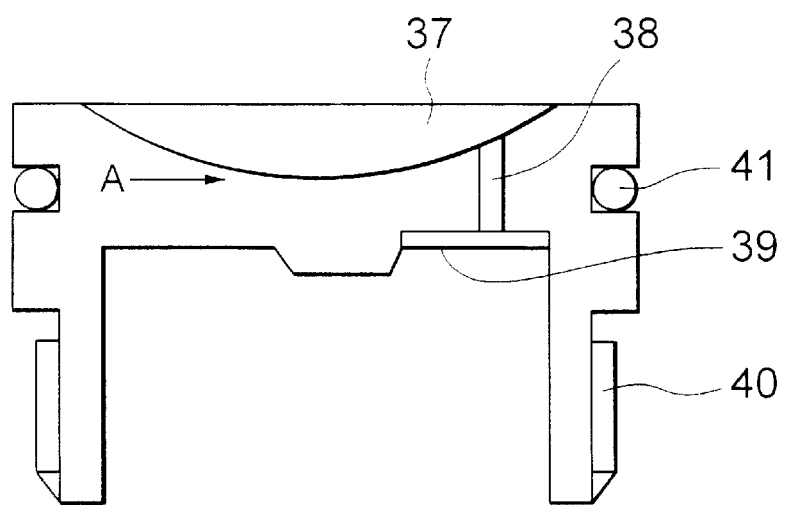
FIG. 23B is a drawing showing a cross-sectional view of the lid shown in FIG. 23A.

The bottom of the groove 37 is deepest at the center thereof, as shown in FIG. 23B. An opening 38 is formed through the bottom of the groove 37 at a portion thereof other than the lowest or deepest bottom portion A of the groove 37.

Through the opening 38 the battery receiving chamber 26 is communicated with an exterior of the body so that a slight amount of gas generated by the battery may leak out through the opening 38.

Assuming that a water droplet has flown into the groove 37, if the opening 38 were located at the deepest portion of the groove 37, the water droplet would flow into the battery chamber through the opening 38. According to the embodiment of the present application, the water droplet is prevented from flowing into the battery chamber.

Further, a water-proof film through which gas may pass but which prevents water or any liquid from passing, may be provided at a boundary portion between the opening 38 and the battery chamber 26. By provision of such a water-proof film, gas generated by the battery received in the chamber may be leaked out of the chamber, while external water may be prevented from flowing into the battery chamber. Gortex (a tradename) may be used for such water-proof film. A two film bonded structure which includes a film having a water-proof function and a film having a gas permeability bonded to the water-proof film, may also be disposed to cover or close the opening 38.

The lid 36 is formed with a cylindrical male screw portion 40 which is engaged with a female screw portion of the body.

An O-ring 41 made from rubber is disposed in a concaved annular portion of an outer periphery of the lid 36 to prevented exterior water from entering into the battery chamber.

By the way, in each embodiment, although the rotating ring is used in the field angle setting portion, it is needless to say that a sliding mechanism may be used instead of the rotating ring.

Moreover, existence of the measured result in the memory 6 can be confirmed by the mode switch 18, so that the measured result can be displayed by pushing the power-measurement switch 17.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A range finder comprising;
   a light source for emitting a light beam to an object to be measured;
   a detector for detecting a reflected light from the object;
   a measuring part for calculating a distance to the object on the basis of the reflected light detected by the detector;
   a display capable of displaying the object and a second object to be measured as well as the distance to the object measured by the measuring part;
   a finder for observing the two objects shown on the display;
   at least one index set on the display for indicating the positions regarding the two objects shown on the display;
   a field angle setting portion, equipped with a moving part for moving the index to the position of the object, for setting a field angle between the two objects on the basis of the positions indicated by the index; and
   a calculating part for calculating a separation between the two objects on the basis of the distance to the object measured by the measuring part and the field angle set by the field angle setting portion.

2. The range finder according to claim 1, wherein the number of the index is two, and wherein the separation between the two indexes can be variable in accordance with the separation between the two objects.

3. The range finder according to claim 1, wherein the moving part in the field angle setting portion is a rotating ring set on the finder.

4. The range finder according to claim 3, wherein the field angle setting portion includes;
   a potentiometer for detecting a rotating angle of the rotating ring; and
   an angle calculating circuit for calculating the field angle on the basis of the detected result of the potentiometer.

5. The range finder according to claim 1, wherein the index indicates the position of the object by a contrast between a clear part and a dark part.

6. The range finder according to claim 1, further comprising a memory for storing the separation between the two objects calculated by the calculating part.

7. The range finder according to claim 1, wherein the display shows the separation between the two objects in an area other than the area where the distance to the object is shown.

8. A range finder comprising;
   a light source for emitting a light beam to an object to be measured;
   a detector for detecting a reflected light from the object;
   a measuring part for calculating the distance to the object on the basis of the reflected light detected by the detector;
   a display capable of displaying the object and a second object to be measured as well as the distance to the object measured by the measuring part;
   a finder for observing the two objects shown on the display;
   at least one index set on the display for indicating the positions regarding the two objects shown on the display;
   a field angle setting portion, equipped with a moving part for moving the index to the position of the object, for setting a field angle between the two objects on the basis of the positions indicated by the index;
   a calculating part for calculating the separation between the two objects on the basis of the distance to the object measured by the measuring part and the field angle set by the field angle setting portion;
   a power-measurement switch for inputting power supply and for carrying out measurement; and
   a mode switch for changing mode to the separation measuring mode.

* * * * *